US011675621B2

(12) United States Patent
Kim et al.

(10) Patent No.: US 11,675,621 B2
(45) Date of Patent: Jun. 13, 2023

(54) METHOD FOR CONTROLLING EXECUTION OF APPLICATION, ELECTRONIC DEVICE AND STORAGE MEDIUM FOR THE SAME

(71) Applicant: Samsung Electronics Co., Ltd., Suwon-si (KR)

(72) Inventors: Kiljae Kim, Suwon-si (KR); Byungsoo Kwon, Suwon-si (KR); Daehyun Cho, Suwon-si (KR); Wonseo Choi, Suwon-si (KR); Kwanhee Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 16/838,419

(22) Filed: Apr. 2, 2020

(65) Prior Publication Data
US 2020/0341805 A1   Oct. 29, 2020

(30) Foreign Application Priority Data

Apr. 26, 2019   (KR) .......................... 10-2019-0049286

(51) Int. Cl.
*G06F 9/46*   (2006.01)
*G06F 9/48*   (2006.01)
*G06F 9/50*   (2006.01)

(52) U.S. Cl.
CPC .......... *G06F 9/4881* (2013.01); *G06F 9/5044* (2013.01); *G06F 2209/482* (2013.01); *G06F 2209/5018* (2013.01)

(58) Field of Classification Search
CPC ................. G06F 9/4881; G06F 9/5044; G06F 2209/482; G06F 2209/5018
See application file for complete search history.

(56) References Cited

U.S. PATENT DOCUMENTS 10,613,897 B1 * 4/2020 Wang ................... G06F 9/4843
2007/0121665 A1   5/2007 Ergan et al.
(Continued)

FOREIGN PATENT DOCUMENTS

| CN | 109254849 A | 1/2019 |
|---|---|---|
| KR | 10-2013-0040636 A | 4/2013 |
| KR | 10-2017-0056646 A | 5/2017 |

OTHER PUBLICATIONS

International Search Report dated Jun. 29, 2020, issued in International Application No. PCT/KR2020/003837.
(Continued)

*Primary Examiner* — Diem K Cao
(74) *Attorney, Agent, or Firm* — Jefferson IP Law, LLP

(57) ABSTRACT

An electronic device is provided. The electronic device includes at least one processor and a memory storing instructions executed to enable the at least one processor to identify a plurality of processes associated with an application, identify at least one process to be operation-restricted during at least partial time of a time of running the application among the plurality of processes, restrict an operation of the at least one identified process during the at least partial time of the time of running the application, and release the operation restriction on at least some of the at least one identified process in response to meeting a preset condition.

18 Claims, 14 Drawing Sheets

(56) References Cited

U.S. PATENT DOCUMENTS

| | | | |
|---|---|---|---|
| 2011/0042246 A1* | 2/2011 | Rowan | A63B 63/00 |
| | | | 206/216 |
| 2011/0213954 A1 | 9/2011 | Baik et al. | |
| 2012/0102499 A1 | 4/2012 | Flemming et al. | |
| 2012/0137122 A1* | 5/2012 | Lu | H04N 21/2362 |
| | | | 713/150 |
| 2013/0042246 A1* | 2/2013 | Berry | G06F 9/4418 |
| | | | 718/102 |
| 2014/0123151 A1 | 5/2014 | Kishan et al. | |
| 2016/0147580 A1* | 5/2016 | Shimizu | G06F 9/4843 |
| | | | 719/318 |
| 2017/0286153 A1 | 10/2017 | Bak et al. | |
| 2017/0300103 A1 | 10/2017 | Wei et al. | |

OTHER PUBLICATIONS

Written Opinion dated Jun. 29, 2020, issued in International Application No. PCT/KR2020/003837.
European Search report dated Feb. 22, 2022, issued in European Application No. 20793987.7.
European Search Report dated Mar. 4, 2022, issued in European Application No. 20793987.7.

* cited by examiner

METHOD FOR CONTROLLING EXECUTION OF APPLICATION, ELECTRONIC DEVICE AND STORAGE MEDIUM FOR THE SAME

CROSS-REFERENCE TO RELATED APPLICATION(S)

This application is based on and claims priority under 35 U.S.C. § 119(a) of a Korean patent application number 10-2019-0049286, filed on Apr. 26, 2019, in the Korean Intellectual Property Office, the disclosure of which is incorporated by reference herein in its entirety.

BACKGROUND

1. Field

The disclosure relates to a method for controlling the execution of an application. More particularly, the disclosure relates to an electronic device, and storage medium for the same.

2. Description of Related Art

With smartphones or other electronic devices gaining higher performance, various services are being offered on electronic devices. For example, more and more applications are coming in wide use to provide more sophisticated services, e.g., Bixby or internet-of-things (IoT), via artificial intelligence (AI) technology. An application program used on such a smart platform is called an application and, when an application is launched, computation may be conducted as resources, e.g., classes, layout, image, or library, are read by the memory. Such launching may require a wait time for the launched application to fully run on the screen. Thus, a screen indicating loading may be displayed on the screen.

The above information is presented as background information only to assist with an understanding of the disclosure. No determination has been made, and no assertion is made, as to whether any of the above might be applicable as prior art with regard to the disclosure.

SUMMARY

Recent electronic devices deliver a better performance and thus run applications more seamlessly. However, upon running a high-resource application, it still takes time to launch the application. The launching time may be prolonged due to various computation tasks and resources necessary when the application is initially executed.

An approach to reduce the application launching time is to schedule as many processes, related to the application, as possible in a high-performance central processing unit (CPU). For example, launching target processes related to the launched application may be rendered to operate on a high-performance CPU.

However, as an electronic device is used for a longer time, background-running processes may increase regardless of the launched application. Thus, despite use of a high-performance CPU, the CPU occupancy may be allocated longer for processing the background processes than for processing the launched application-related process. Moreover, turning all the background processes to the freeze state to avoid unnecessary scheduling may cause a malfunction in the electronic device.

Aspects of the disclosure are to address at least the above-mentioned problems and/or disadvantages and to provide at least the advantages described below. Accordingly, an aspect of the disclosure is to provide a method for enhancing the launching speed upon running an application.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor and a memory storing instructions which, when executed by the at least one processor, cause the at least one processor to identify a plurality of processes associated with an application, identify at least one operation-restricted process among the plurality of processes, the at least one operation-restricted process being operation-restricted during at least a portion of a time of running the application, restrict an operation of the at least one operation-restricted process during the at least the portion of the time of running the application, and release the operation restriction on a first operation-restricted process among the at least one operation-restricted process in response to meeting a preset condition.

In accordance with another aspect of the disclosure, a method for controlling execution of an application on an electronic device is provided. The method includes identifying a plurality of processes associated with an application, identifying at least one operation-restricted process among the plurality of processes, the at least one operation-restricted process being operation-restricted during at least a portion of a time of running the application, restricting an operation of the at least one operation-restricted process during the at least the portion of the time of running the application, and releasing the operation restriction on a first operation-restricted process among the at least one operation-restricted process in response to meeting a preset condition.

In accordance with another aspect of the disclosure, an electronic device is provided. The electronic device includes a storage medium storing instructions, the instructions configured to, when executed by at least one processor, enable the at least one processor to perform at least one operation, the at least one operation comprising identifying a plurality of processes associated with an application, identifying at least one operation-restricted process among the plurality of processes, the at least one operation-restricted process being operation-restricted during at least a portion of a time of running the application, restricting an operation of the at least one operation-restricted process during the at least the portion of the time of running the application, and releasing the operation restriction on a first operation-restricted process among the at least one operation-restricted process in response to meeting a preset condition.

According to various embodiments, the operation of the processes with less dependency upon launching of the application during the application launching period may be restricted, allowing the application launching operation to be done more quickly. Thus, launching speed may be increased, and the launching time the user feels may be shortened.

According to various embodiments, since the processes to be operation-restricted are varied based on the dependency on the application whenever the application runs, operation restriction may be performed more flexibly than in the fixed operation restriction scheme. Further, the application may be executed in a more stable manner.

According to various embodiments, it is possible to increase the launching speed when the application is executed by increasing the priority for the process which is the launching target upon running the application to allow the process to be processed earlier than the other processes.

According to various embodiments, it is possible to prevent a delay in application launching due to an increase in background processes that may be caused by long-term use of the electronic device. Thus, the electronic device may remain in stable performance for a long time.

According to various embodiments, although the system is busy in a certain circumstance, e.g., application update or abnormal operation in the background, the application launching speed may remain constant as in the normal state of the system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
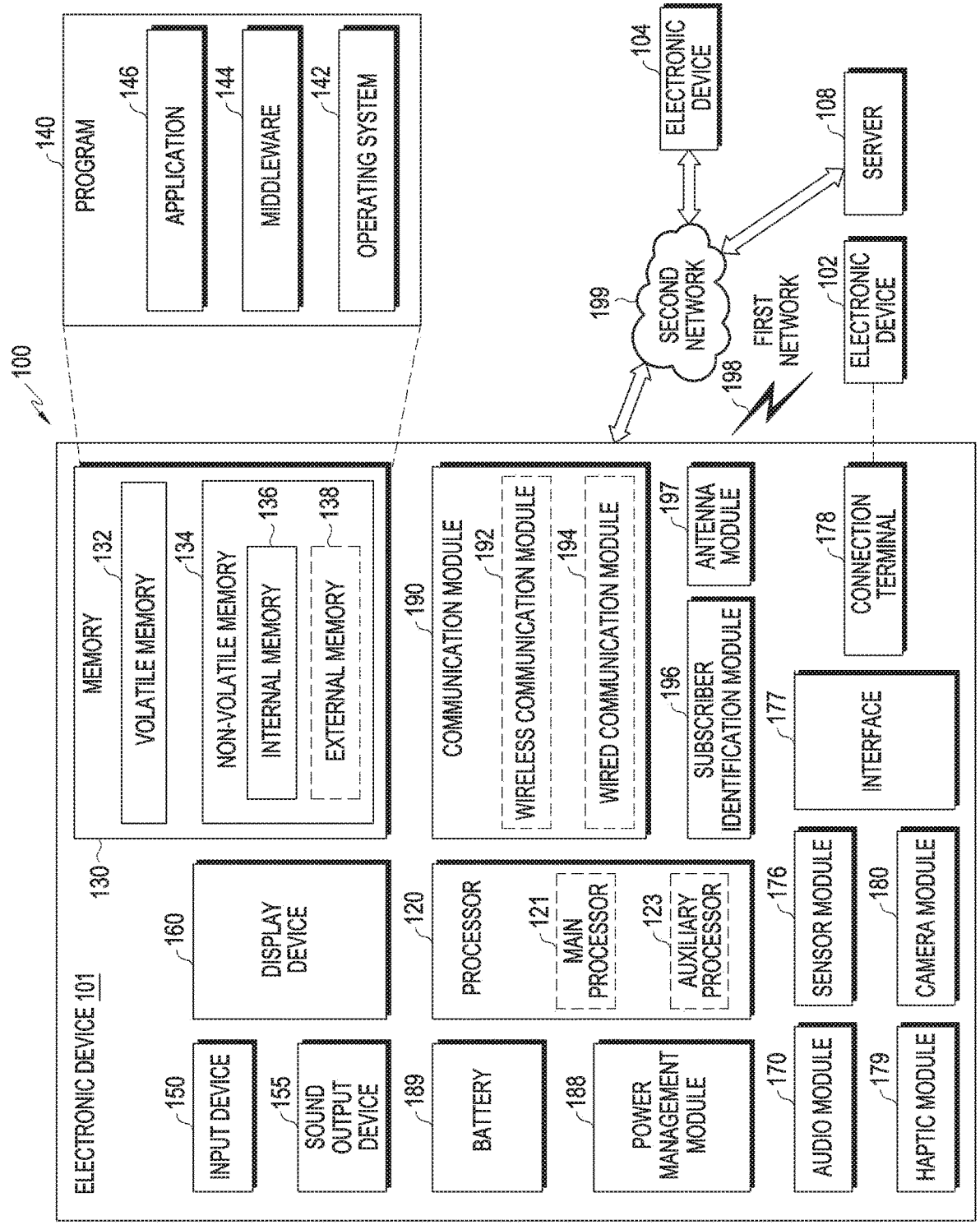
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Described below in detail is a method for shortening the launching time of the running application to speed up the operation of the process required to launch the application at the system level. To reduce the launching time of an application upon running the application, largely two methods may be adopted, e.g., restricting other unnecessarily running processes than the launching application and maximizing the system operation clock.

Background processes tend to increase in proportion to the use time of the electronic device. Full restriction on the operations of the increasing background processes may cause a malfunction in the electronic device and, thus, so doing is impracticable. Thus, as the background operations increase, the background process may occupy the CPU for a longer time. If some background processes are restricted using a predefined list, the application launching time may rather prolong. For example, since various processes, such as network operation, display operation, or kernel thread, are involved as critical sections upon launching the application, it may be hard to restrict all the background processes.

However, according to an embodiment, the launching speed in execution of an application and stable execution of the application may be achieved by dynamically varying the process that is restricted whenever running the application. To that end, according to an embodiment, a restriction may be imposed on the operation of at least one process based on dependency among a plurality of processes associated with an application upon running the application. As such, the operation of the processes with less dependency upon launching of the application during the application launching period may be restricted, allowing the application launching operation to be done more quickly. Thus, launching speed may be increased, and the launching time the user feels may be shortened.

Meanwhile, the approach of maximizing the system operation clock, although shortening the application launching time, may drastically increase current consumption due to increased processing. Further, in the case where there is a sharp increase in background processes due to a long-term use, application launching may take longer even with an increased operation clock.

However, according to various embodiments, it is possible to increase the launching speed when the application is executed by increasing the priority for the process which is the launching target upon running the application to allow the process to be processed earlier than the other processes. Quick launching may be rendered possible by scheduling higher-priority processes using a high-performance CPU.

The foregoing is described below in detail with reference to FIG. 2A.

Figure 2A:
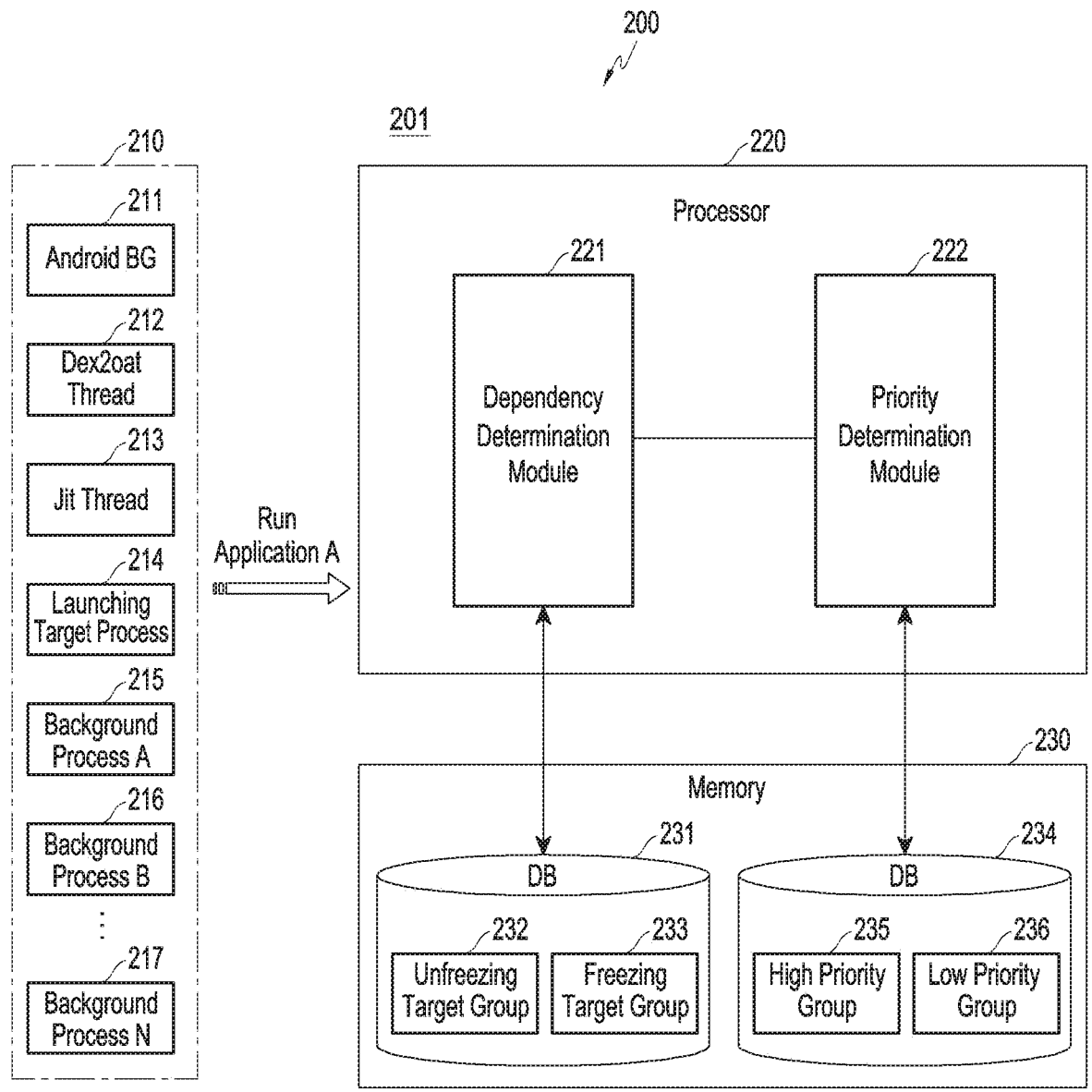
FIG. 2A is a block diagram illustrating an electronic device according to an embodiment of the disclosure.

FIG. 2A is a block diagram (200) illustrating an electronic device according to an embodiment of the disclosure.

The term "module" used in connection with FIG. 2A denotes a unit processing at least one function or operation and be implemented in hardware, software, or a combination thereof. Although the term "module" is used in connection with FIG. 2A, the term may be interchangeably used with "unit," or "device."

Referring to FIG. 2A, an electronic device 201 may include a processor 220 and a memory 230. The electronic device 201 may correspond to the whole or part of, e.g., the electronic device 101 of FIG. 1. Although FIG. 2A illustrates an example in which a dependency determination module 221 and a priority determination module 222 are included in the processor 220, the respective operations of the dependency determination module 221 and the priority determination module 222 may be performed under the control of the processor 220 or may be performed by the processor 220 alone instead of the dependency determination module 221 and the priority determination module 222.

The memory 230 may store at least one application. The memory 230 may store data for a running application, maintaining and managing the application. For example, the application may be launched (or executed) as resources, such as classes, layout, images, or library, are read by the memory 230. The launched application needs a wait time to be fully executed, and such wait time may be referred to as an application launching time.

According to an embodiment, the memory 230 may include a dependency DB 231 and a priority DB 234. When an application is executed by the dependency determination module 221, a plurality of processes 210 associated with the application may be divided into a process that corresponds to a launching target based on dependency on the application and a process that corresponds to a freezing target to be operation-restricted while launching.

The dependency DB 231 may include an unfreeze target group 232 classified as unfreeze target processes and a freeze target group 233 classified as freeze target processes. According to an embodiment, the unfreeze target group 232 and the freeze target group 233 may store information about processes associated with the application, rather than actual processes. For example, dependency information about each process updated while the application runs may be stored in the dependency DB 231. For example, the process to be operation-restricted and launching target process, upon launching the application, may be determined based on dependency information stored per multiple processes associated with each application.

Meanwhile, the priority DB 234 may include a high priority group 235 and a low priority group 236. According to an embodiment, the high priority group 235 may store information on the process to which a higher priority has been assigned and at least one thread in the process. The low priority group 236 may store information about the other threads in the launching target process than the at least one thread to which the higher priority has been assigned. The low priority group 236 may also store information about the process that has been operation-restricted during the application launching period.

Referring to FIG. 2A, although, if application A starts to run, the launching target process 214 related to application A needs to be executed, processes with less dependency upon application A may also run in the background. For example, the remaining background processes A, B, . . . , N (215, 216, 217) may be background processes that have increased as the electronic device 201 is used for a longer time, and these processes may have less dependency upon the application requested to run. Although such processes as Android BG 211, DEX2OAT thread 212, and just-in-time (JIT) thread 213, may be processes that may run during the application launching period, such processes are not the ones that need to be executed during the launching period and may have less dependency upon the application.

Thus, according to an embodiment, restricting the execution of the other less-dependent processes, including the background processes, than the launching target process 214 may shorten the launching time of application A. To that end, the dependency determination module 221 may identify less-dependent background processes among the background processes running in the background and restrict their operation, and the dependency determination module 221 may previously manage the processes irrelevant to the execution of application A during the launching period as freeze targets to be frozen within the launching period.

According to various embodiments, such processes as Android BG 211, DEX2OAT thread 212, and just in time (JIT) thread 213 may be previously included in the freeze target group 233. The remaining background processes A, B, . . . , N (215, 216, 217) may be frozen during the launching period of the application requested to run. In other words, the remaining background processes A, B, . . . , N (215, 216, 217) may be added to the freeze target group 233 not to be operated during the launching period.

According to an embodiment, the dependency determination module 221 may change a froze process back into the unfreeze state according to an event occurring during the application launching while maintaining the freeze state for the other frozen processes until the application launching is complete. For example, for a background process corresponding to the occurrence of an event among the background processes A, B, . . . , N (215, 216, 217) which have been added to the freeze target group 233 for which operation restriction is applied during the launching period, the dependency determination module 221 may change the freeze state in which operation is restricted into the unfreeze state in which operation restriction is released.

Although, in the above description, the processes to be operation-restricted until the application launching is complete remain in the freeze state, the processes not corresponding to the event may be kept in the freeze state until the application ends.

Thereafter, upon termination of the application, the dependency determination module 221 may update the dependency DB including the unfreeze target group 232 and the freeze target group 233. For example, the dependency determination module 221 may update the dependency DB 231 by adding the processes frozen until application launching is complete to the freeze target group 233.

As such, rather than all the processes being frozen during application launching upon running an application on the electronic device 201, at least one process is selectively changed into the freeze state, corresponding to detection of various events, such as a network event or binder call, as well as an external event, e.g., user input. Thus, launching may be accelerated, and any malfunction in the electronic device 201 may be prevented.

The binder call is briefly described below.

Android operating system (OS) provides components in process units and may be configured of Linux-based java. Applications running on Android OS may be operated as independent processes on Linux, and applications created by Java may be run on the java virtual machine.

Since all applications are provided in the form of processes, inter-application interactions need a requesting-responding mechanism between processes. Such a mechanism for inter-process communication is the binder. For example, functions provided by other processes in the Android OS system may be provided via the binder.

A binder driver may be used to share the program and data necessary to run an intended service upon executing an application. For example, an application may invoke a system call provided on Linux, performing communication. Thus, data exchange may be performed between different applications or between different services by the binder call.

According to an embodiment, the processor 220 may include a dependency determination module 221 and a priority determination module 222. The processor 220 may determine at least one process to be operation-restricted during the launching period for running the application and restrict the operation of the determined process. The processor 220 may monitor the context of the electronic device 201 during the launching period and, upon detecting an event, may determine the process for which operation restriction is to be released and release the operation restriction.

As such, the operation restriction on one or more processes corresponding to detection of the event among the operation-restricted processes may be released during the launching period. However, if the launching period ends, i.e., launching is complete, all the operation-restricted processes may be released from operation restriction. For example, since the processes to be operation-restricted are varied based on the dependency on the application whenever the application runs, operation restriction may be performed more flexibly than in the fixed operation restriction scheme. Further, the application may be executed in a more stable manner. Thus, despite frequent application update and various kinds of applications, the optimized application launching may be achieved in the smartphone environment because processes to be operation-restricted may be varied based on dependency upon application. Further, since the processes to be subject to operation restriction are varied and updated whenever the application runs, launching time may be shortened by actively freezing processes with no dependency upon the application.

According to an embodiment, an electronic device 201 comprises at least one processor 220 and a memory 230 storing instructions executed to enable the at least one processor 220 to identify a plurality of processes associated with an application, identify at least one process to be operation-restricted during at least partial time of a time of running the application among the plurality of processes, restrict an operation of the at least one identified process during the at least partial time of the time of running the application, and release the operation restriction on at least some of the at least one identified process in response to meeting a preset condition.

According to an embodiment, the preset condition may include a launching time of the application, and the instructions may be configured to enable the at least one processor 220 to, when the application launching time elapses, release the operation restriction on the at least one identified process.

According to an embodiment, the preset condition may include detecting at least one event, and the instructions may be configured to enable the at least one processor 220 to release the operation restriction on a process corresponding to detection of the at least one event among the at least one identified process.

According to an embodiment, the instructions may be configured to enable the at least one processor 220 to identify at least one process to be operation-restricted during the at least partial time of the time of running the application among the plurality of processes based on a dependency on the application.

According to an embodiment, the instructions may be configured to enable the at least one processor 220 to add the at least one identified process to an operation restriction group and, in response to the operation restriction group including a process corresponding to detection of at least one event, release from the operation restriction group.

According to an embodiment, the operation restriction group may be updated so that at least some of processes included in the operation restriction group are varied whenever the application runs.

According to an embodiment, the instructions may be configured to enable the at least one processor 220 to determine a priority for at least one process except for the at least one identified process among the plurality of processes.

According to an embodiment, the instructions may be configured to enable the at least one processor 220 to increase a priority for at least one thread in the at least one process.

According to an embodiment, the instructions may be configured to enable the at least one processor 220 to schedule at least one thread in the at least one process higher in priority by a central processing unit (CPU) with a first operation speed and schedule a remaining thread in the at least one process by a CPU with a second operation speed. The first operation speed may be set to be higher than the second operation speed.

According to an embodiment, the instructions may be configured to enable the at least one processor 220 to, when the application launching time elapses, change the priority for the at least one thread in the at least one process to an original priority.

The operations of the dependency determination module 221 and the priority determination module 222 of FIG. 2A are described below in greater detail with reference to FIG. 2B.

Figure 2B:
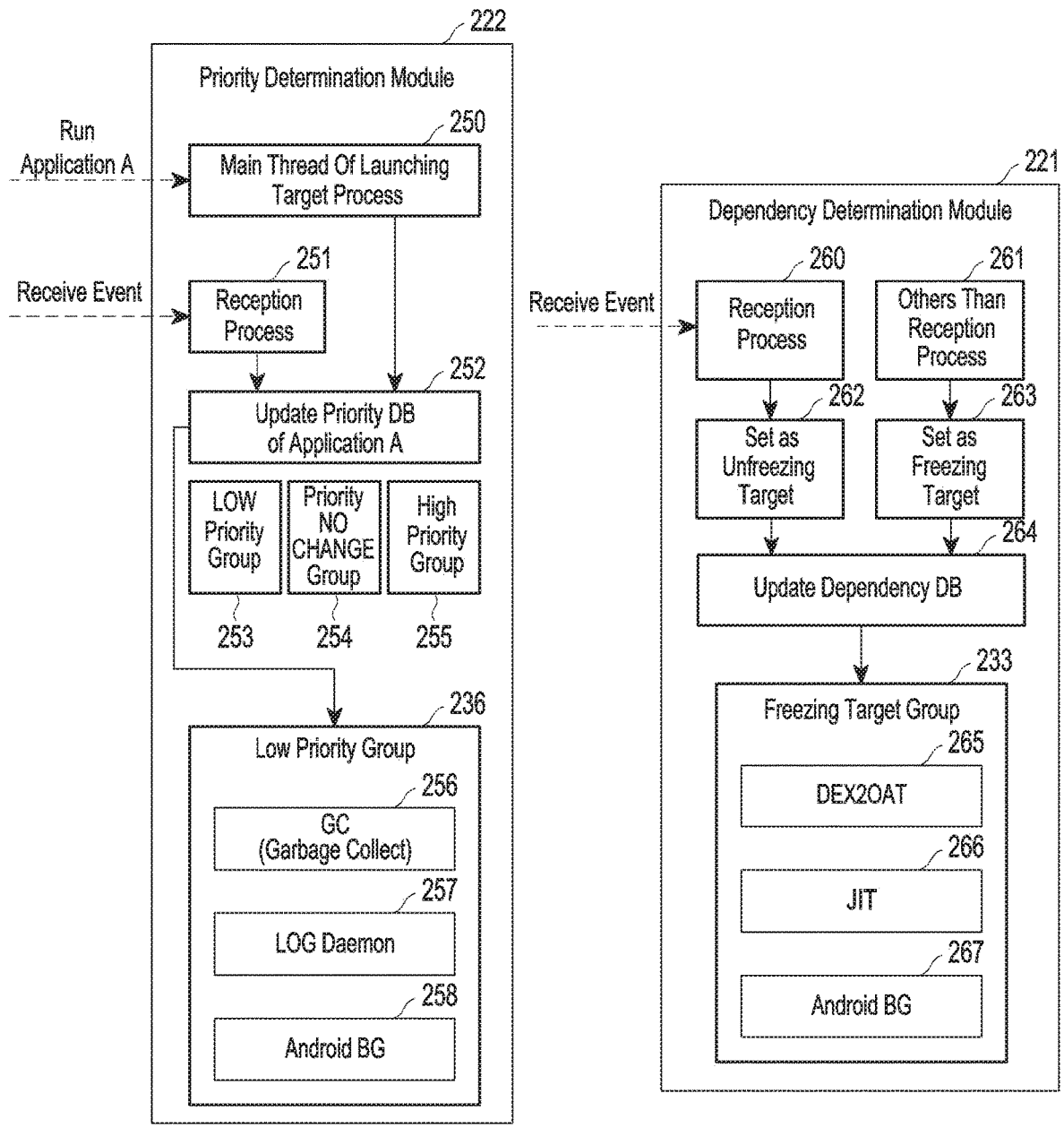
FIG. 2B is a view illustrating a detailed configuration of a dependency determination module and a priority determination module according to an embodiment of the disclosure.

FIG. 2B is a view illustrating a detailed configuration of a dependency determination module 221 and a priority determination module 222 according to an embodiment of the disclosure.

Referring to FIG. 2B, all the operations of the dependency determination module 221 and the priority determination module 222 may start corresponding to a user input. For example, a user input may be transferred via the touchscreen to launch (or execute) an application (e.g., application A), and thus, the dependency determination module 221 and priority determination module 222 may be driven.

According to an embodiment, the dependency and priority may be determined when the application is executed corresponding to a user request. In contrast, if an application irrelevant to the user request runs, the dependency and priority determination may not be performed. For example, if the user accidently runs the application, e.g., screen off, only the database (DB) for at least one of the dependency and priority may be updated without performing operation restriction on one or more processes upon launching. As such, operation restriction may be imposed on one or more processes only for execution of the application which the user has intended to run, i.e., the user's intended application, so that launching may be accelerated, and the launching time the user feels may be shortened. For the user's intended application, the application may occasionally auto-run even without a user input. In the application auto-run context, dependency and priority determination may be carried out, imposing operation restriction on one or more processes.

Specifically, if application A launches corresponding to a user request, the dependency determination module 221 may select one or more processes associated with application A and run the selected processes. The one or more processes associated with the application may be related to one or more hardware or software components of the electronic device 201, and the one or more selected processes may be executed by activating the hardware or software components associated with the one or more selected processes.

For example, upon launching of an application run request from the user, an application (e.g., application A) including one or more processes may be executed corresponding to the request. Here, the process that is associated with application A and is actually executed may be called a launching target process.

According to an embodiment, one or more application-associated processes may include launching target processes that need to be executed when driving the application. Here, the processes required to necessarily run when the application is driven may include, e.g., system processes that have no dependency but involve critical system tasks, e.g., execution of application, among the one or more application-associated processes, and such necessary launching target processes may be set as an unfreeze target group.

The one or more application-associated processes may include at least one of graphic processes, network processes, media processes, log processes, or connection processes. Specifically, the graphic processes may be processes necessary for updating the screen of the user interface application, the network processes may be processes necessary for transmission/reception of data to/from the network, the media processes may be processes necessary for outputting videos and audio, the log processes may be processes for gathering log data, and the connection processes may be processes used for communication with external devices.

According to an embodiment, the dependency determination module 221 may identify at least one process to be operation-restricted during the execution of the application among the one or more application-associated processes. Here, the application execution period (or time) may be at least part of the time (or duration) during which the application runs.

According to an embodiment, the dependency determination module 221 may identify at least one process to be operation-restricted based on the dependency on the application. Thus, the dependency determination module 221 may freeze the at least one identified process. To determine whether there is dependency on the application, the dependency DB (e.g., the dependency DB 231 of FIG. 2A) may be referenced. Whenever the application runs, at least some of the processes included in the operation-restricted group may be varied, updating the dependency DB. Thus, the dependency determination module 221 may newly determine whether there is dependency whenever the application runs, by the application update or the process for which dependency is varied when the application runs.

According to an embodiment, the dependency determination module 221 may manage the at least one identified process, which corresponds to the freeze target, as the freeze target group to be operation-restricted. Thus, the dependency determination module 221 may add the at least one identified process to the freeze target group. Here, the freeze target group may also be referred to as an operation-restricted group or non-dependency group including frozen processes.

According to an embodiment, the operation of at least one process identified may be restricted from the application starts until the launching ends. For example, if application launching is complete, the dependency determination module 221 may release the operation restriction on the at least one identified process. The dependency determination module 221 may update the database while releasing the operation restriction on the at least one identified process that has been managed as the freeze target group. As such, the operation restriction on all the processes that have been operation-restricted simultaneously with the start of application launching may be released at the time of completion of the application launching.

According to an embodiment, the dependency determination module 221 may determine whether to release the operation restriction on the at least one process depending on whether an event occurs. The dependency determination module 221 may detect whether at least one event occurs during the launching period. For example, if a specific process associated with application A starts, the dependency determination module 221 may monitor whether such an event as a binder call by which the specific process requests another process occurs. Based on the monitoring, the dependency determination module 221 may identify the dependency between the processes.

Upon receiving at least one event during the launching period, the dependency determination module 221 may set the process 260 receiving the event, among the one or more application-associated processes, as an unfreeze target and designate the same as the unfreeze target group (262).

In contrast, the dependency determination module 221 may set the processes 261 failing to receive such an event as a binder call, among the one or more application-associated processes, as freeze targets 263 and add them to the freeze target group 233. Corresponding to setting as the unfreeze target and freeze target, the dependency DB may be updated (264). In other words, whenever at least one process is designated for the unfreeze targets and freeze targets, the dependency DB may be updated.

Meanwhile, the dependency determination module 221 may release the operation restriction on the process corresponding to the detected event among the operation-restricted processes in the freeze target group 233 based on at least part of the detected event. Thus, the dependency determination module 221 may delete the operation restriction-released process from the freeze target group 233 and designate the same as the unfreeze target group.

According to an embodiment, the at least one event may be an event that occurs inside the electronic device 201 or is triggered by an external device or user and may include, e.g., external events, e.g., user inputs, as well as at least one of network events or binder calls.

The dependency determination module 221 operated as described above may separately manage a plurality of application-associated processes using the unfreeze target group 232 and the freeze target group 233 in the memory 230. According to an embodiment, the dependency determination module 221 may divide the plurality of application-associated processes into the unfreeze target group 232 and the freeze target group 233 based on the dependency on the application.

According to an embodiment, largely two methods may be considered to shorten the launching time of application upon running the application: a dependency-based scheme of restrict other processes unnecessarily operating than the launching application and a priority-based scheme of maximizing the system operation clock for the launching target process.

According to an embodiment, the dependency-based scheme which is one of the schemes for increasing application launching speed may be a scheme that, when an application runs, turns at least one process less dependent upon the application into the freeze state while the application launches to stop unnecessary scheduling and, at the time of completion of the launching, turns the at least one frozen process back into the unfreeze state. Here, the at least one less-dependent process may be identified by referring to the database (DB) (e.g., the dependency DB 231 of FIG. 2A) for the freeze target group (or operation-restricted group) in the memory 230. When the application, after downloaded, is first executed, the dependency determination module 221 may identify the processes to be operation-restricted among the processes associated with the downloaded application by referring to predetermined freezing target processes. According to an embodiment, examples of the predetermined freezing target processes in the freeze target group 233 may include, e.g., DEX2OAT 265, just-in-time (JIT) 266, and Android BG 267.

The DEX2OAT 265 is a process that is run when an execution file, e.g., APK, is installed and, as the APK is compiled, huge loads may be generated within a short time. The DEX2OAT comes largely in two kinds: internal DEX2OAT and normal DEX2OAT. Since the internal DEX2OAT has a dependency on the application of the launching target, it may be excluded from the freeze targets. In contrast, the normal DEX2OAT, a process executed while the application is updated or installed, has no dependency on the application launching procedure, it may be designated as a freeze target and then be frozen during the launching period.

The JIT 266 is a process that previously compiles the hot code frequently used as a compiler to raise the use performance of application. The JIT (266) compiler serves to previously compile the hot code detected during the application launching with a source code in the form of JAVA bytecode. However, since such compiling is compiling the hot code which is detected during an operation after the application has been launched, rather than while the application is launching, it has no dependency on the launching. Further, since the JIT 266 has a large compiling load and memory usage, the dependency determination module 221 may previously designate the JIT 266 as the freeze target group 233 before running the application and freeze it during the launching period.

The Android background (BG) 267 is gathering and processing jobs that need not be immediately processed by each Android system server and has no dependency on application launching. Thus, the dependency determination module 221 puts the Android BG 267 in the freeze target group 233 and freezes it during the launching period.

According to an embodiment, as another scheme for increasing the application launching speed, the priority-based scheme may raise the priority of the process, as the launching target, among the plurality of processes associated with the application when the application is launching, and at least one thread in the launching target process and, at the time of completion of the application launching, change the raised priority of the process and thread in the process back into the original priority.

According to an embodiment, the processor 220 may process tasks using threads. For example, while each process individually takes up the memory, the plurality of threads may share the memory in the process. The plurality of threads may include a main thread, a worker thread, and a user interface (UI) thread.

The main thread may be allocated or generated per application and may be in charge of tasks recognizable by the user, such as input processing and UI update. Thus, the launching time the user feels may be shortened by setting a high priority for the main thread.

The UI thread may be responsible for the task of requesting a UI component. For example, the UI thread may process a UI update request. Thus, if a high priority is set for the UI thread, the user may see the rapidly launched application screen. As such, the launching time the user feels may be reduced.

The worker thread may deal with huge data and complicated computation. The worker thread may be generated when performing tasks, e.g., storage I/O or network I/O, that require relatively long-term processing, as compared with the tasks handled by the main thread. There may be provided a plurality of worker threads.

According to an embodiment, the priority determination module 222, if application A starts to run, may lower the priorities for processes unrelated to launching among the processes associated with application A while assigning a high priority to the process directly related to the launching. For example, if application A starts to run, the priority determination module 222 may determine a priority for the launching target process associated with application A. The launching target process may include at least one thread. By allowing the launching target process and the main thread and UI thread in the launching target process to run quickly, the application launching time the user feels may be shortened.

To that end, according to an embodiment, corresponding to a user input for executing the application, the priority determination module 222 may assign a higher priority to the main thread and UI thread 250 in the launching target process associated with the application so that they may be executed more rapidly than the operation of the other processes. For example, the UI may be quickly displayed on the screen right after the application is executed by setting a higher priority for the main thread and UI thread upon initial execution of the application so that the launching time the user feels may be shortened. Thus, the priority determination module 222 may assign a higher priority to the main thread and UI thread 250 in the launching target process and update (252) the priority DB of application A.

As such, a top priority, e.g., real-time (RT) priority, may be assigned to raise the priority for the main thread and UI thread in the launching target process. To prevent a priority reversion that may occur when the priority for the main thread and UI thread in the launching target process goes up, the RT priority may be assigned to the process communicating with other process to be first processed. Assignment of the RT priority may reduce preemption of CPU scheduling by other tasks and thus increase CPU usage. The high priority-assigned thread may be scheduled to operate on a high-performance CPU.

Since a quick response is needed for the process corresponding to the high-priority group and at least one thread in the process, a CPU (e.g., a high-performance CPU) with a first operation speed may be used to accelerate processing and hence application launching. In contrast, the process corresponding to the low-priority group and at least one thread in the process may be processed with a CPU (e.g., a low-performance CPU) with a second operation speed. Here, the first operation speed may be higher than the second operation speed. Thereafter, when the application launching is complete or the application terminates, the main thread and UI thread in the high priority-assigned target process may go back into their original priority.

As described above, a higher priority may be set, during application launching, for the launching target process among the plurality of processes associated with the application and at least one thread in the launching target process whereas the other processes and at least one thread therein may be assigned a lower priority. For example, the freezing target process and at least one thread in the freezing target process may be assigned a lower priority than that set for the launching target process.

Further, the priority determination module 222 may monitor binder communication from the launching target process to the outside and may raise the priority, also, for the process 251 of receiving an event, e.g., binder call, thereby updating the priority DB of application A (252). For example, the process corresponding to reception of the event may be assigned the RT priority to be scheduled earlier than the other processes and, as the occupancy of high-performance CPU increases, quick processing may be possible. In contrast, for processes that lack a binder call with the launching target process, i.e., processes failing to receive the event or the other processes than the ones receiving the event, the priority may be lowered or they may be scheduled with their original priority. Such a low-priority process and at least one thread therein may be operated by a low-performance CPU.

The priority determination module 222 may divide at least one launching target process and at least one thread in the launching target process into a low priority group 253, priority no change group 254, and a high priority group 255.

For example, the low priority group 236 may include a garbage collect (GC) 256, a log daemon 257, and an Android BG 258. Here, the GC 256 may refer to a program that, when the memory is insufficient, releases the memory to be used for other purposes. The log daemon 257 may refer to a program that moves system-related tasks to the background.

Thereafter, upon completion of the application launching or termination of the application, the priority determination module 222 may update the priority DB (e.g., the DB 234 of FIG. 2A) including the high priority group 235 and the low priority group 236. For example, the process which has been in the freeze state until before the application launching is complete and at least one thread in the freezing target process may be added to the low priority group 236, so that the priority DB may be updated.

According to an embodiment, when the application is terminated, the priority determination module 222 may change the raised priority of the at least one process and at least one thread in the process back to the original priority. Further, the priority determination module 222 may temporarily raise the priority for the process corresponding to an event occurring during the application launching among the plurality of processes associated with the application and at least one thread in the process, during the application launching and, when the application launching is complete or application terminates, change back to the original priority.

Figure 3:
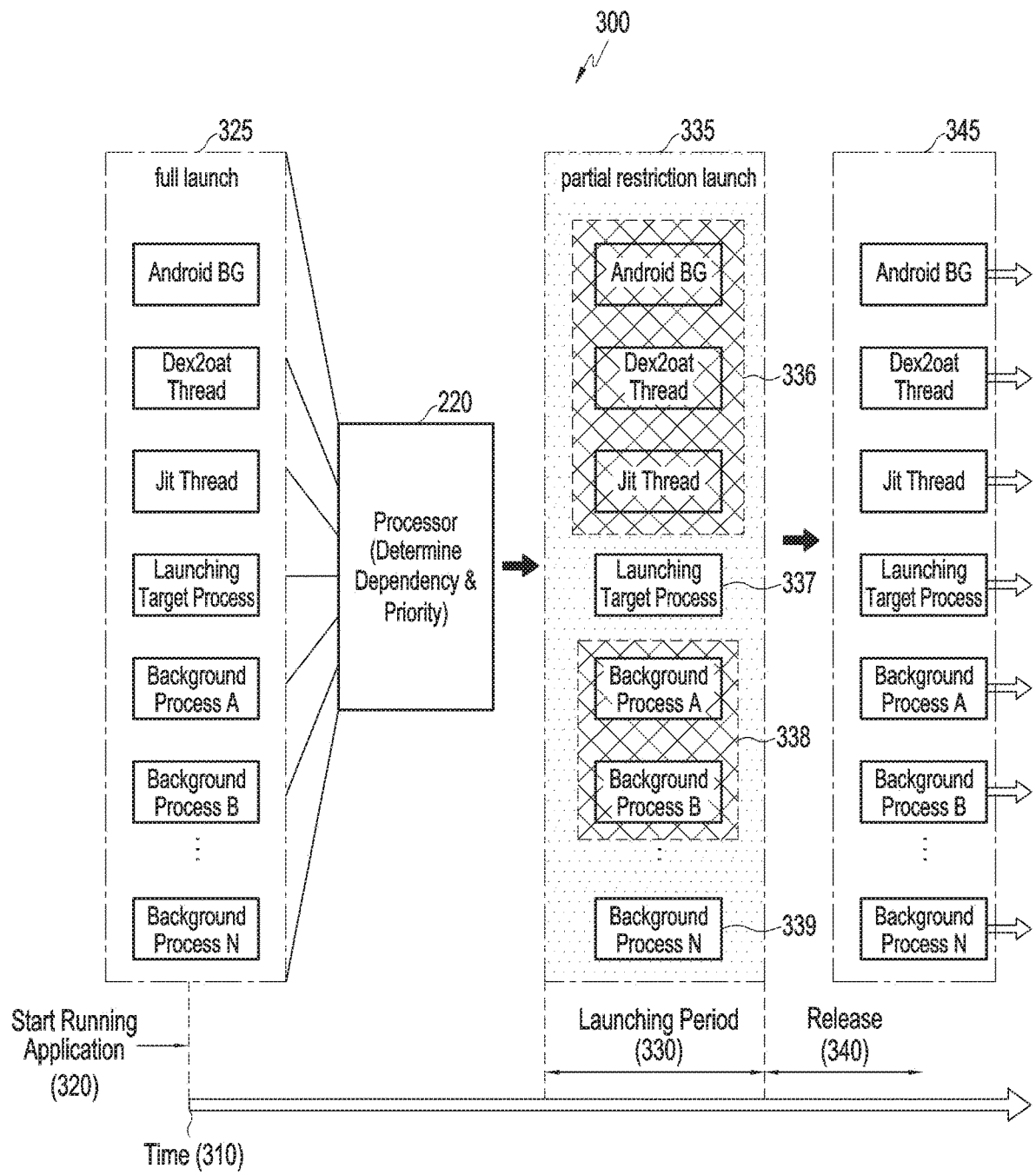
FIG. 3 is a view illustrating a process of operation restriction on one or more processes when an application runs according to an embodiment of the disclosure.

FIG. 3 is a view (300) illustrating a process of operation restriction on one or more processes when an application runs according to an embodiment of the disclosure.

Referring to FIG. 3, reference number 310 denotes the time axis which may be divided largely into a start time 320 of execution of an application, an application launching period 330, and a release period 340 after launching is complete.

First, if the application is executed (320) corresponding to a user request, in the case of full launch (325) that poses no restriction on one or more processes based on dependency and priority, background processes and processes unrelated to application launching, as well as application-related launching target processes may be all executed during the launching period.

In contrast, at least one process to be operation-restricted among the one or more application-associated processes may be determined by the dependency and priority determination operation among the processes of the full launch (processes 325). As shown in FIG. 3, the processor 220 may identify processes 336 previously determined to be freeze targets among the plurality of processes 325 and background processes A and B 338 not related to the application among the background processes based on the dependency on the application. Thus, within the launching period 330, the other processes 336 and 338 than the background process N 339 and the launching target process 337 related to the application may be frozen. In other words, the other processes 336 and 338 may be operation-restricted within the launching period 330.

Thereafter, if the launching period 330 ends, i.e., if the launching time elapses, the operation-restricted processes 336 and 338 may be released from operation restriction. As set forth above, partial restriction launch 335 may be performed within the launching period 330 and, upon release after the launching period 330 (release period 340), the operation-restricted processes 345 may be all unfrozen. After the launching period 330, the application may be in the state of running.

Figure 4A:
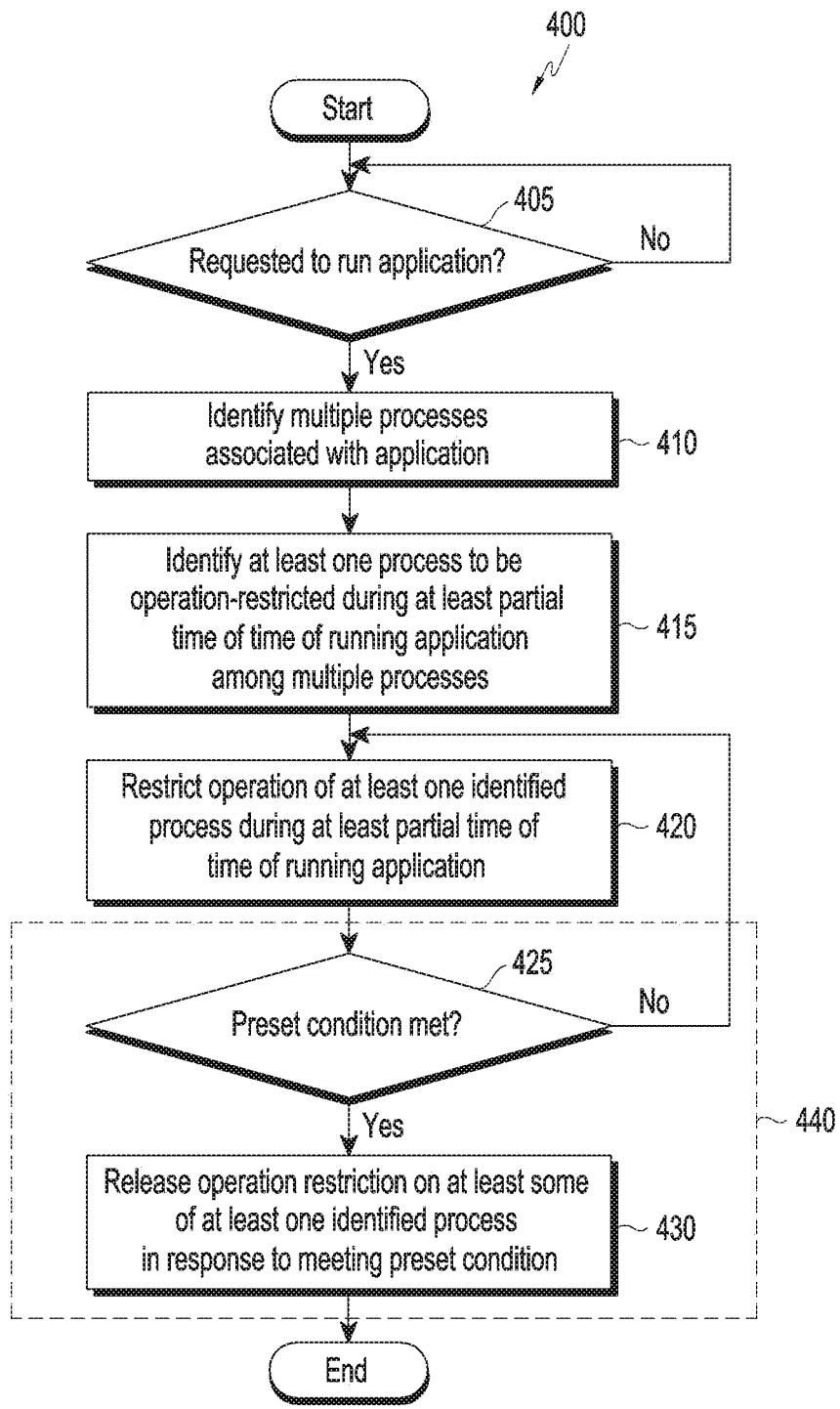
FIG. 4A is a flowchart illustrating operations of an electronic device for controlling the execution of an application according to an embodiment of the disclosure.

FIG. 4A is a flowchart (400) illustrating operations of an electronic device for controlling the execution of an application according to an embodiment of the disclosure.

Referring to FIG. 4A, the operation method may include operations 405 to 430. Each operation of the operation method may be performed by at least one of an electronic device (e.g., the electronic device 101 or 201 of FIG. 1 or 2A) or at least one processor (e.g., the processor 120 or 220 of FIG. 1 or 2A) of the electronic device. According to an embodiment, at least one of operations 405 to 430 may be omitted or changed in order or may add other operations.

Referring to FIG. 4A, the application may start to run, corresponding to a user request, e.g., the user's touch input. Thus, the electronic device 201 may determine whether there is an application run request from the user in operation 405.

If there is an application run request, the electronic device 201 may identify a plurality of processes associated with the application in operation 410. Then, the electronic device 201 may identify at least one process to be operation-restricted during at least part of the time of running the application among the plurality of processes in operation 415. According to an embodiment, the at least part of the time of running the application may include the application launching time.

In operation 420, the electronic device 201 may restrict the operation of at least one process identified during the at least part of the time of running the application. According to an embodiment, the at least one process to be operation-restricted during the application launching time may be identified based on dependency upon the application. For example, the processes receiving no event, e.g., binder call, among the plurality of processes may be determined to have no dependency on the application. Thus, the processes that lack binder communication for exchange data between processes may be operation-restricted within the launching period.

According to an embodiment, the at least one identified process may be added to the operation restriction group and may be operation-restricted.

Thereafter, the electronic device 201 may identify whether a preset condition is met in operation 425. If the preset condition is met, the electronic device 201 may release the operation restriction on at least some of the at least one identified process in response to meeting the preset condition in operation 430. According to an embodiment, if the operation restriction group includes a process meeting the preset condition, the electronic device 201 may release the process from the operation restriction group. According to an embodiment, the operation restriction group may be updated so that at least some of processes included in the operation restriction group are varied whenever the application runs.

According to an embodiment, the preset condition may include a launching time of the application, and releasing the operation restriction of the at least some of the at least one identified process may include, if the application launching time elapses, releasing the operation restriction on the at least one identified process.

According to an embodiment, the preset condition may include detecting at least one event, and releasing the operation restriction on the at least some of the at least one identified process may include releasing the operation restriction on a process corresponding to detection of the at least one event among the at least one identified process.

For example, in a case where a contact application is provided by the user, when the contact application launches, a contact DB may be fetched via a binder call from the contact provider process, in which case the contact provider process may be determined to have a dependency on the contact application and may be managed as an uplink transmission power so that it is not frozen when the contact application launches.

As set forth above, with the operation of one or more processes operation-restricted within the application launching time, the electronic device may continuously monitor whether the preset condition is met, until the application launching terminates.

An example of monitoring whether the preset condition is met is described with reference to FIG. 4B.

Figure 4B:
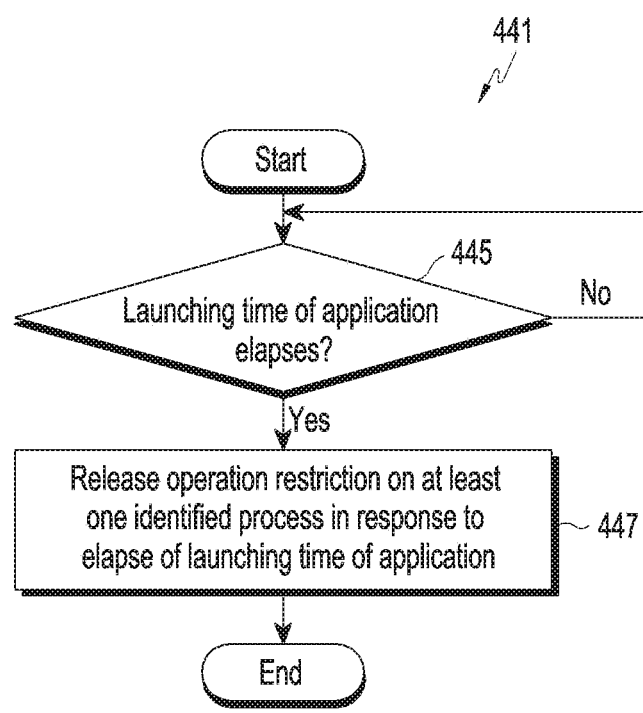
FIG. 4B is a flowchart illustrating operations of an electronic device based on launching time of an application according to an embodiment of the disclosure.

FIG. 4B is a flowchart (441) illustrating operations of an electronic device based on launching time of an application according to an embodiment of the disclosure.

Operation 441 of FIG. 4B, including operations 445 and 447 of FIG. 4B, may correspond to operations 425 and 430 of FIG. 4A.

Referring to FIG. 4B, if the preset condition indicates the application launching time, the electronic device 201 may determine whether the application launching time elapses in operation 445. Until before the application launching time elapses, the operation restriction on the at least one identified process may be maintained as in operation 420 of FIG. 4A.

In contrast, if the application launching time elapses in operation 445, the electronic device 201 may release the operation restriction on the at least one identified process in response to the elapse of the application launching time in operation 447.

Figure 5:
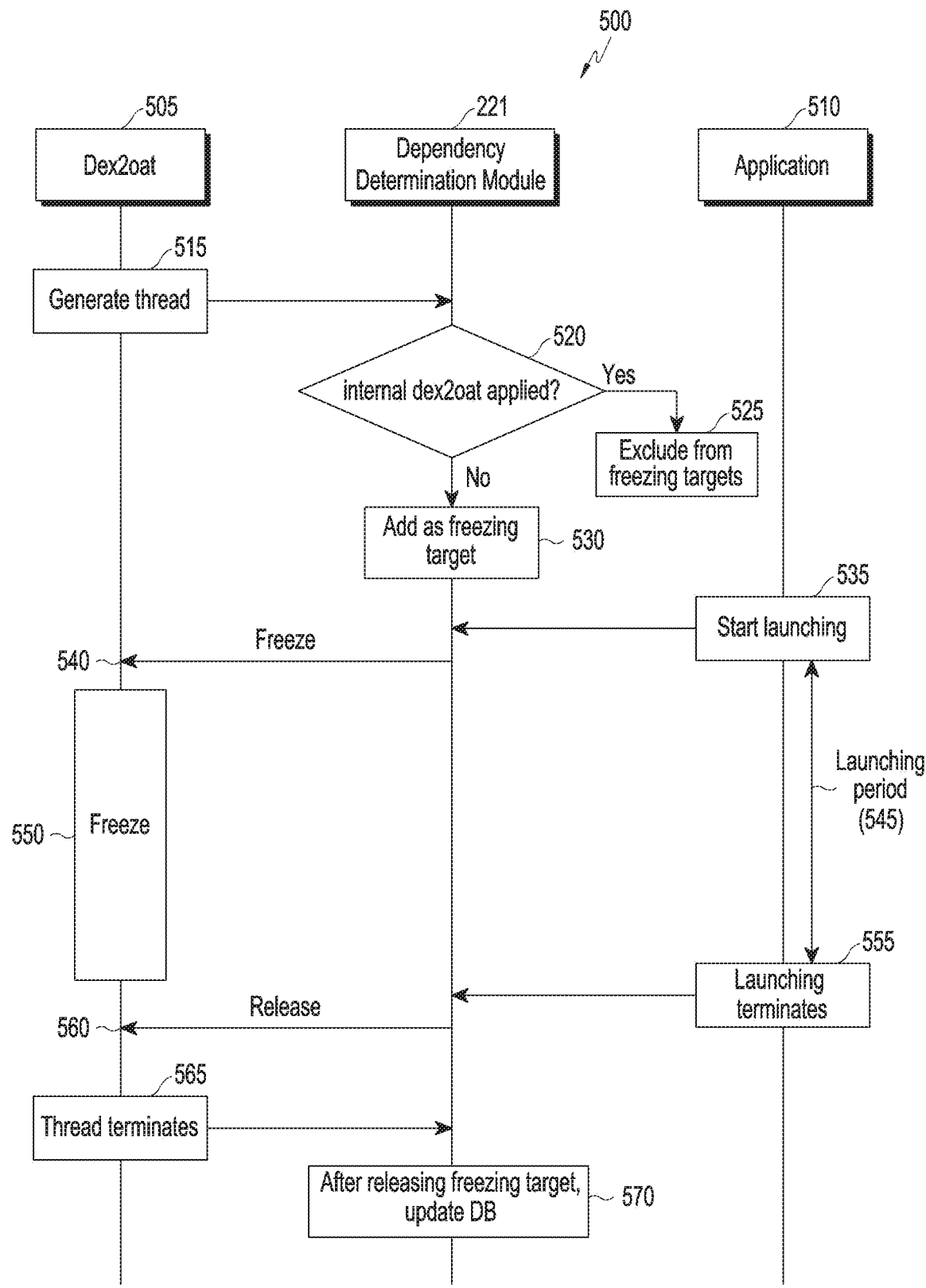
FIG. 5 is a signal flowchart for operation restriction on a freezing target process according to an embodiment of the disclosure.

FIG. 5 is a signal flowchart (500) for operation restriction on a freezing target process according to an embodiment of the disclosure. FIG. 5 illustrates DEX2OAT as an example freezing target process.

Referring to FIG. 5, if a thread is generated (515) from the DEX2OAT 505, the dependency determination module 221 may determine whether the DEX2OAT 505 is the internal DEX2OAT in operation 520. If the DEX2OAT 505 is the internal DEX2OAT in operation 520, the dependency determination module 221 may exclude it from freeze targets in operation 525. Since the internal DEX2OAT may compile in real-time, it has a dependency on the launching target application and may be excluded from the freeze targets. In contrast, since the normal DEX2OAT is performed when compiled only once upon application installation or update, it has no dependency on the application launching and may thus be added to the freeze targets as in operation 530.

Although the determination on whether it is a freeze target may be performed after the application 510 is executed or it may be previously stored in the freeze target group regardless of whether the application 510 runs. Thus, if the application 510 runs and starts to launch in operation 535, the pre-stored freeze target group may be referenced or executed and then whether it is a freeze target may be determined and, if so, the DEX2OAT 505 may be controlled to be frozen in operation 540. Thus, the DEX2OAT 505 may remain in the freeze state 550 during the launching period 545.

Thereafter, if the launching of the application 510 is complete in operation 555, the dependency determination module 221 may release the operation restriction on the DEX2OAT 505 in operation 560. Then, as the thread in the DEX2OAT 505 terminates in operation 565, i.e., as the operation of the DEX2OAT 505 is ended, the DB may be updated after the DEX2OAT 505 is released from the freeze targets in operation 570. As such, freezing may be maintained only on processes unrelated to the application 510 within the launching period 545 from the start of launching in operation 535 to the termination of the launching in operation 555.

Figure 6:
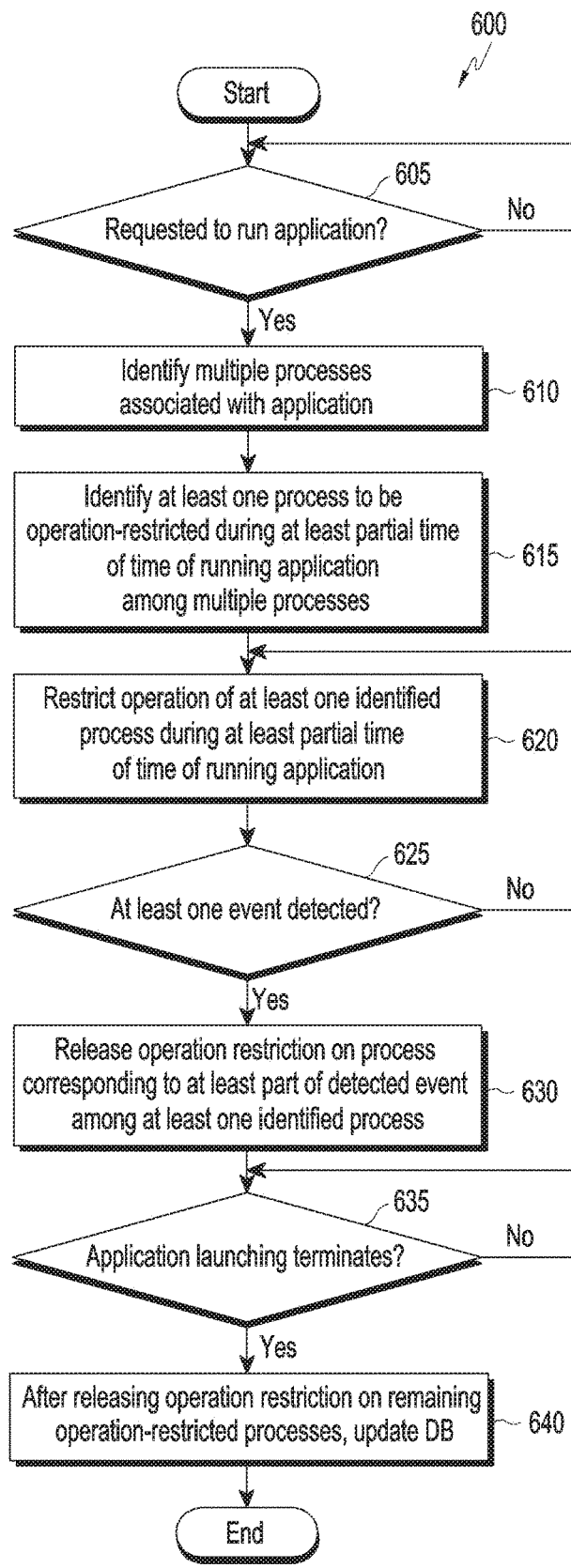
FIG. 6 is a flowchart illustrating operations of an electronic device when an event occurs according to an embodiment of the disclosure.

FIG. 6 is a flowchart (600) illustrating operations of an electronic device when an event occurs according to an embodiment of the disclosure.

Referring to FIG. 6, the operation method may include operations 605 to 640. Each operation of the operation method may be performed by at least one of an electronic device (e.g., the electronic device 101 or 201 of FIG. 1 or 2A) or at least one processor (e.g., the processor 120 or 220 of FIG. 1 or 2A) of the electronic device. According to an embodiment, at least one of operations 605 to 640 may be omitted or changed in order or may add other operations.

Operations 605 to 620 of FIG. 6 are the same as operations 405 to 420 of FIG. 4A, and no detailed description thereof is repeated.

Operations 625 and 630 of FIG. 6 may correspond to operation 440 including operations 425 and 430 of FIG. 4A. An example of monitoring whether the preset condition is met in FIG. 4A is described with reference to FIG. 6.

Referring to FIG. 6, the electronic device 201 may determine whether at least one event is detected in operation 625, with at least one process identified during the launching period operation-restricted. If at least one event is detected, the electronic device 201 may release the operation restriction on the process corresponding to detection of the at least one event among the at least one identified process in operation 630. Then, the electronic device 201 may determine whether the application launching is terminated in operation 635. If the application launching has not been terminated yet, e.g., until before the launching time elapses, the electronic device may monitor whether the launching time elapses. In contrast, if the application launching is terminated, the electronic device 201 may release the operation restriction on the other operation-restricted processes and update the DB in operation 640.

Figure 7:
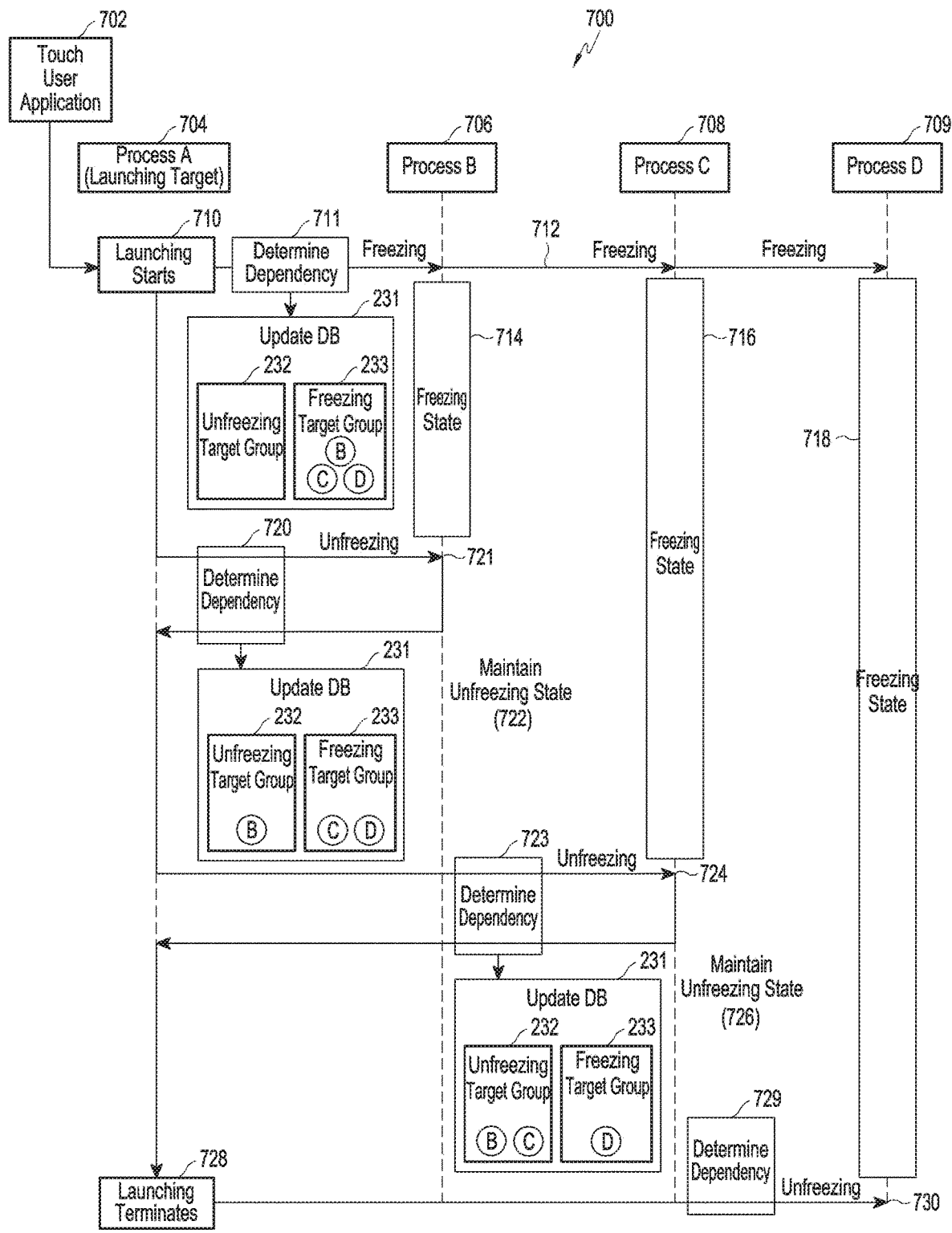
FIG. 7 is a signal flowchart illustrating a dependency-based process control procedure upon initially running an application according to an embodiment of the disclosure.

FIG. 7 is a signal flowchart (700) illustrating a dependency-based process control procedure upon initially running an application according to an embodiment of the disclosure.

Referring to FIG. 7, if a user touch is input (702) for running an application on the electronic device 201, application launching (710) may commence. For example, if a plurality of processes associated with the application are processes A, B, C, and D, the application launching 710 may be started by the user touch, and dependency determination 711 may be performed. If the launching target process is process A 704, and this process is first launched since the application has been installed, because it is before the DB is built up, the dependency determination module 221 may, upon initial execution, add processes B, C, and D 706, 708, and 709, except for process A 704, to the freeze target group 233 and update the dependency DB 231. Thus, the dependency determination module 221 may freeze processes B, C, and D 706, 708, and 709 to restrict the operation of processes B, C, and D 706, 708, and 709 within the launching period in operation 712. Processes B, C, and D 706, 708, and 709 may remain in the freeze states 714, 716, and 718 until an unfreeze instruction occurs.

Thereafter, the dependency determination module 221 may perform monitoring for detecting an event during the launching period. If a binder call from process A 704 to process B 706 occurs upon monitoring, the dependency determination module 221 may determine (720) that process B 706 has a dependency on process A 704. Thus, the dependency determination module 221, after deleting process B 706 from the freeze target group 233, may add process B 706 to the unfreeze target group 232 and update (231) the DB. Subsequently, the dependency determination module 221 may unfreeze process B 706 to release the operation restriction on process B 706, and process B 706 may maintain (722) the unfreeze state corresponding to the unfreeze instruction in operation 721.

Thereafter, if a binder call from process A 704 to process C 708 occurs upon monitoring, the dependency determination module 221 may determine (723) that process C 708 has a dependency on process A 704. Thus, the dependency determination module 221, after deleting process C 708 from the freeze target group 233, may add process C 708 to the unfreeze target group 232 and update (231) the DB. Further, the dependency determination module 221 may unfreeze process C 708 in operation 724. Corresponding to this, process C 708 may maintain (726) the unfreeze state corresponding to the unfreeze instruction.

In contrast, if process D 709 exchanges no data with process A 704 during the launching period, the freeze state 718 may be maintained until before the launching ends. Thereafter, if the launching ends (728), the freeze state of process D 709 which used to belong to the freeze target group 233 may be released and unfrozen (730) via dependency determination 729.

Corresponding to the initial execution of the application as described above, processes B and C 706 and 708 may be managed as included in the unfreeze target group 232, and process D 709 may be managed as included in the freeze target group 233.

Figure 8:
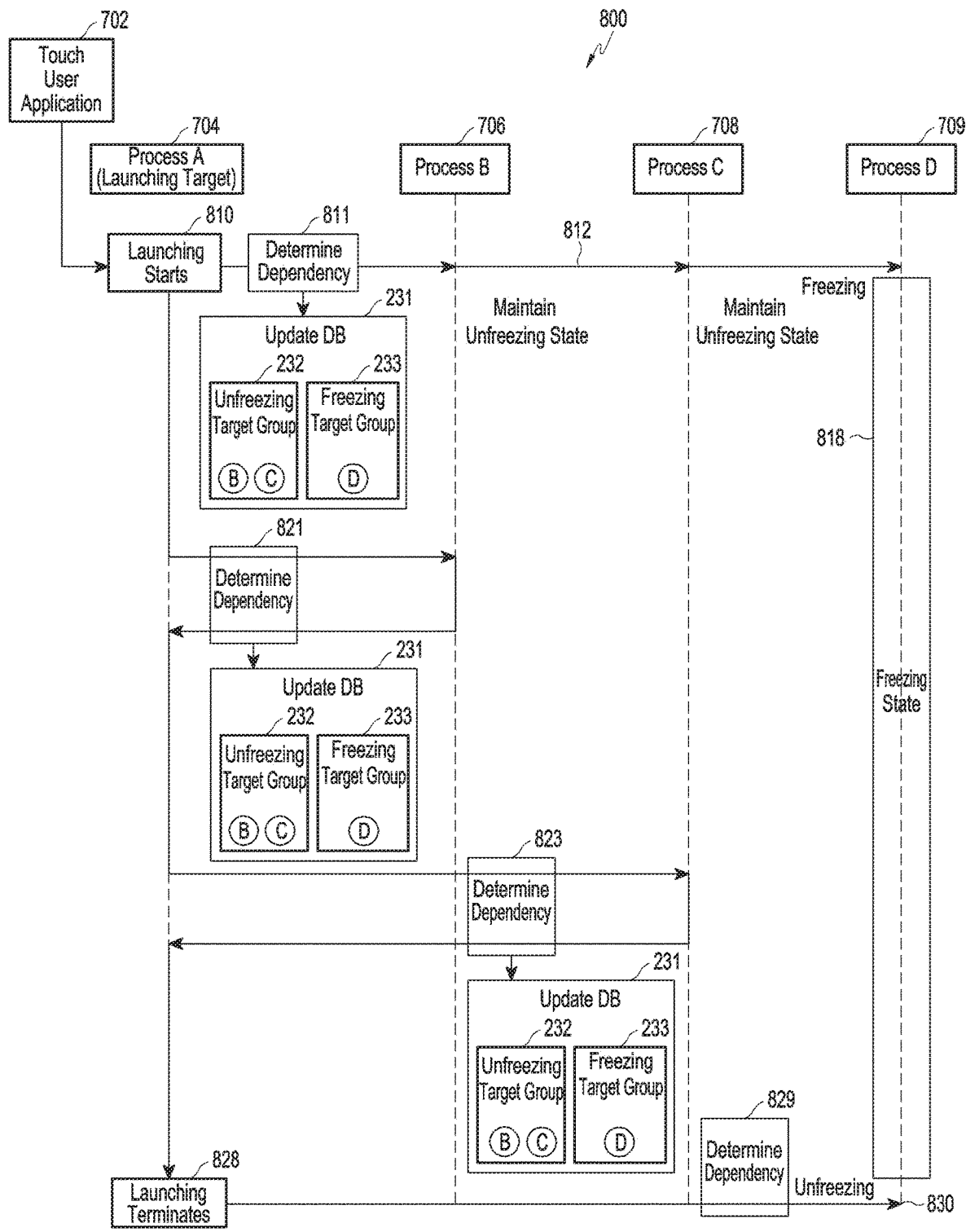
FIG. 8 is a signal flowchart illustrating a dependency-based process control procedure upon re-running an application according to an embodiment of the disclosure.

FIG. 8 is a signal flowchart (800) illustrating a dependency-based process control procedure upon re-running an application according to an embodiment of the disclosure.

Referring to FIG. 8 illustrates the flow of signals when the same application as the one executed in FIG. 7 runs again. Referring to FIG. 8, the dependency determination module 221, if the application previously run re-runs, may be operated based on the dependency DB configured upon the initial execution. For example, the dependency DB configured upon the initial running may include processes B and C 706 and 708 in the unfreeze target group 232 and process D 709 in the freeze target group 233.

Thus, if application starts to launch (810), dependency determination 811 may be performed by referring to the dependency DB. Thus, the dependency determination module 221 may maintain the unfreeze state for processes B and C 706 and 708 while freezing process D 709 and maintaining (818) the freeze state in operation 812.

Thereafter, the unfreeze state may be maintained for processes B and C 706 and 708 corresponding to detection of an event, e.g., binder call, via dependency determination 821 and 823. If there is no binder call to process D 709 via the dependency determination 829 until the time 828 of termination of the launching period, the freeze state 818 of process D 709 may be maintained and, at the time 828 of termination of the launching, be unfrozen (830).

Figure 9:
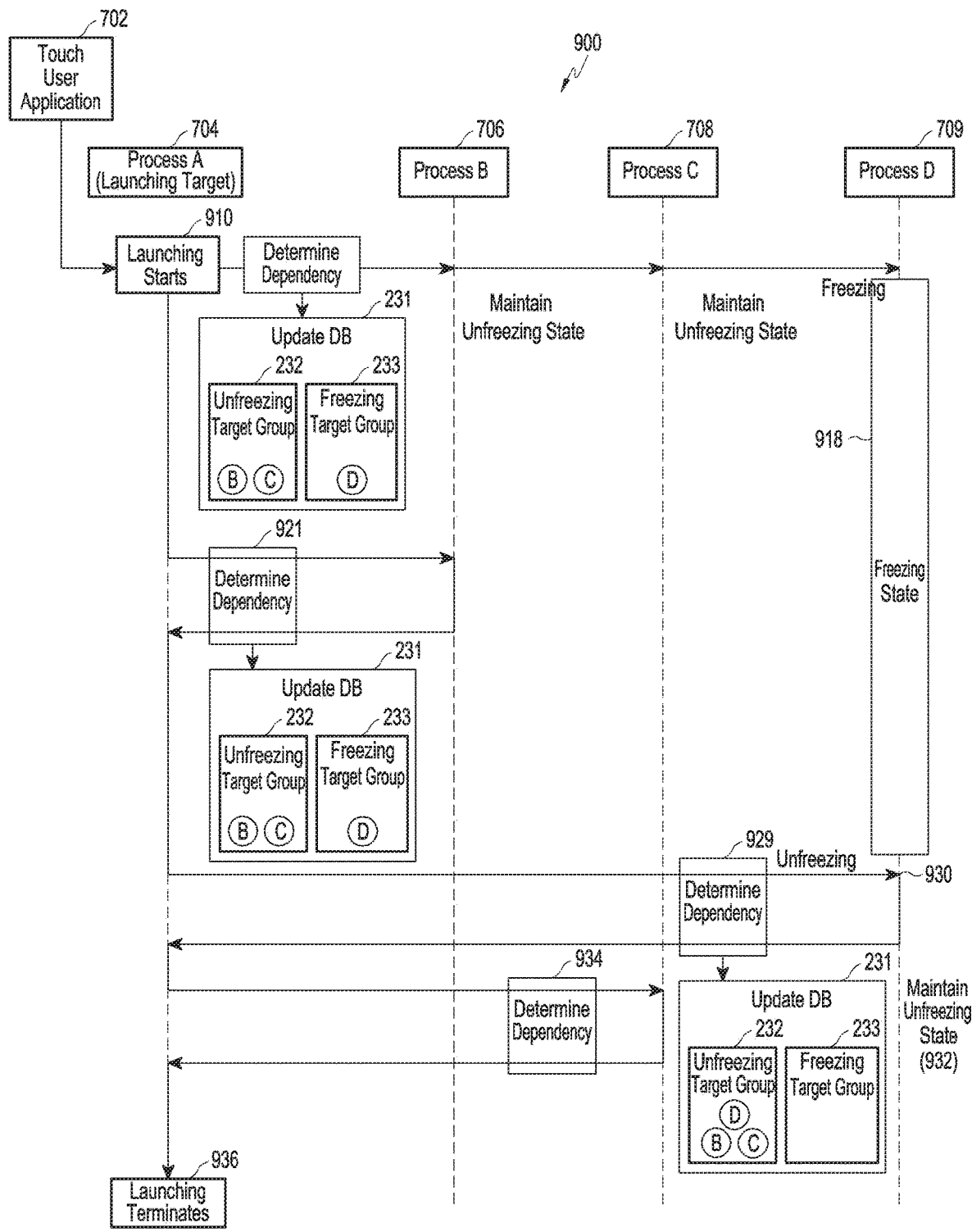
FIG. 9 is a signal flowchart illustrating a dependency-based process control procedure upon updating an application according to an embodiment of the disclosure.

FIG. 9 is a signal flowchart (900) illustrating a dependency-based process control procedure upon updating an application according to an embodiment of the disclosure.

The operations of FIG. 9 are similar to the operations of FIG. 8 and are thus not described below in detail. Referring to FIG. 9 illustrates an example in which as the operation of process A is changed due to application update, the dependency DB is also updated. For example, process A 704 may occasionally need to exchange data with process D 709. In this case, the dependency DB of FIG. 9 may be identical to the dependency DB of FIG. 8. For example, the dependency DB may include processes B and C 706 and 708 in the unfreeze target group 232 and process D 709 in the freeze target group 233.

After the launching starts (910), the dependency determination module 221 may perform dependency determinations 921 and 934 of continuously monitoring whether data is exchanged between process A 704 and processes B and C 706 and 708. If such a circumstance occurs where process A 704 needs to exchange data with process D 709 within the launching period, e.g., when a binder call from process A 704 to process D 709 occurs via dependency determination 929, the dependency determination module 221 may unfreeze (930) process D 709, and the freeze state 918 of process D 709 may thus be released. Subsequently, the dependency determination module 221 may control to move process D 709 from the freeze target group 233 to the unfreeze target group 232 via the dependency DB 231. Thus, until before the launching ends, process D 709 may remain in the unfreeze state 932.

Thereafter, when the launching ends (936), the DB may be updated to allow the unfreeze target group 232 to include processes B, C, and D 706, 708, and 709.

Thus, if the application is re-run later, the dependency determination module 221 may freeze processes B, C, and D 706, 708, and 709 not to be operation-restricted within the launching period based on the updated DB. Unlike this, if the non-occurrence of a binder call with process B 706 persists, during the launching period, until the launching terminates, the dependency determination module 221 may designate process B 706 as in the freeze target group 233 and update the DB. Thus, if the application runs again, the dependency determination module 221 may freeze process B 706 during the launching period based on the updated DB. As such, since the freeze target group in the dependency DB is updated so that at least some of the processes included in the freeze target group are varied whenever the application runs, even when the application is frequently updated, the process to be adaptively operation-restricted within the launching period may be identified and, thus, an application launching speed may be ensured.

Figure 10:
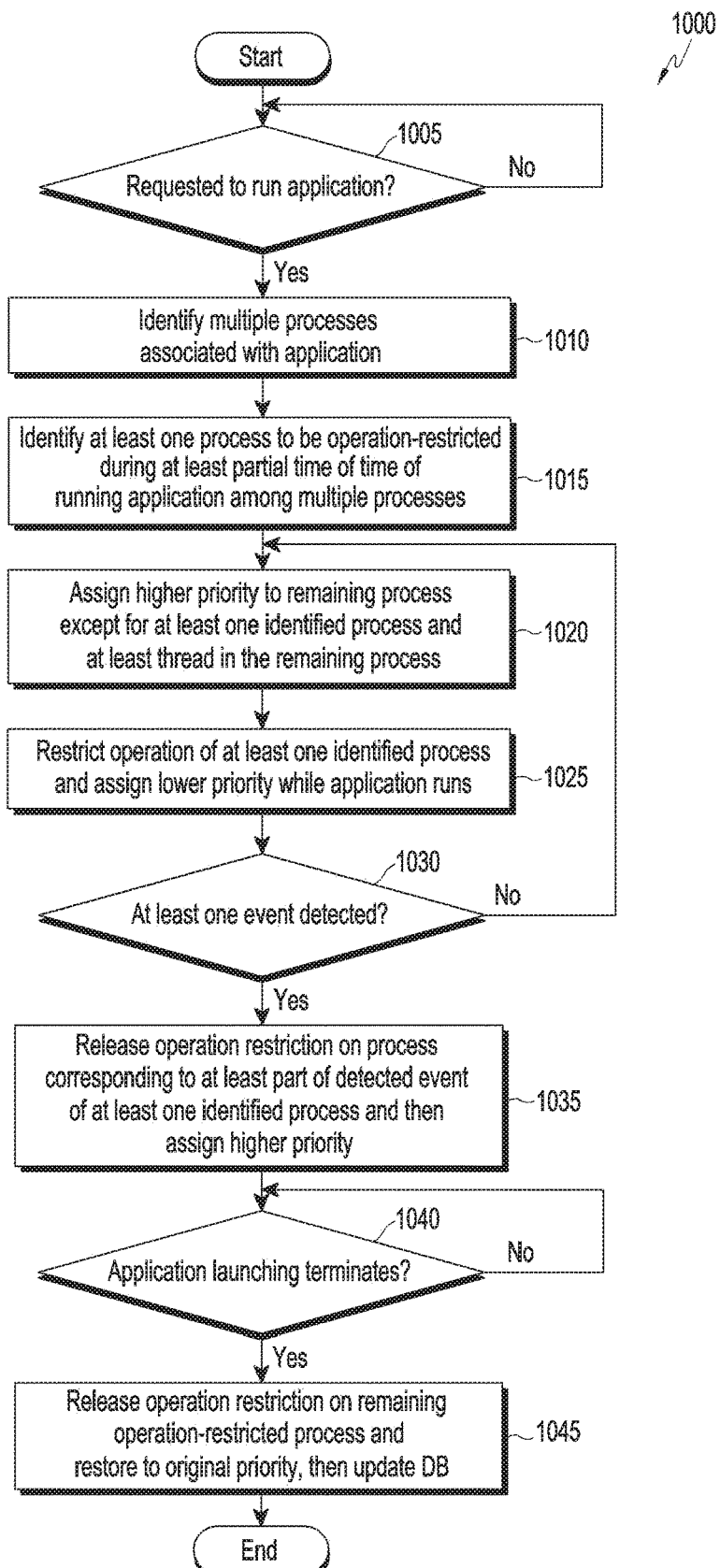
FIG. 10 is a flowchart illustrating operations of an electronic device based on priority according to an embodiment of the disclosure.

FIG. 10 is a flowchart (1000) illustrating operations of an electronic device based on priority according to an embodiment of the disclosure.

Referring to FIG. 10, the operation method may include operations 1005 to 1045. Each operation of the operation method may be performed by at least one of an electronic device (e.g., the electronic device 101 or 201 of FIG. 1 or 2A) or at least one processor (e.g., the processor 120 or 220 of FIG. 1 or 2A) of the electronic device. According to an embodiment, at least one of operations 1005 to 1045 may be omitted or changed in order or may add other operations.

Operations 1005 to 1015 of FIG. 10 are the same as operations 405 to 415 of FIG. 4A, and no detailed description thereof is repeated.

Referring to FIG. 10, the electronic device 201 may assign a higher priority to the other processes than the at least one identified process and at least one thread in the processes in operation 1020. For example, if higher priorities are assigned to all of the remaining processes, priority reversion or priority conflict may occur with other processes. Thus, a higher priority may be assigned to at least one process. Since at least one process includes at least one thread, such as main thread, UI thread, or worker thread, a priority may be determined also for at least one thread in the at least one process.

For example, the electronic device 201 may assign the top priority, e.g., the RT priority, to the main thread and UI thread that needs to first be processed.

Then, in operation 1025, the electronic device 201 may restrict the operation of the at least one identified process while running the application and assign a lower priority. For example, the at least one identified process may be assigned a lower priority not to be operated within the launching period. Or, the electronic device 201 may control to schedule it with a low-performance CPU so that a specific operation in the process may be performed within the launching period although assigned a lower priority. As such, the electronic device 201 may control the process assigned a lower priority and at least one thread in the process to be scheduled with the low-performance CPU.

As such, according to an embodiment, the electronic device 201 may assign a higher priority to at least one process except for the at least one identified process among the plurality of processes associated with the application and at least one thread in the at least one process.

According to an embodiment, the electronic device 201 may perform scheduling at least one thread in the at least one process to which the higher priority has been assigned by a CPU with a first operation speed and scheduling a remaining thread in the at least one process by a CPU with a second operation speed. According to an embodiment, the first operation speed may be set to be higher than the second operation speed.

In operation 1030, the electronic device 201 may determine whether at least one event is detected. If at least one event is detected, the electronic device 201 may release the operation restriction on the process corresponding to at least part of the detected event among the at least one identified process and assign a higher priority to it in operation 1035. In contrast, if the at least one event is not detected, the electronic device 201 may go back to operation 1020.

Then, the electronic device 201 may determine whether the application launching is terminated in operation 1040. The above-described operations may be maintained until the application launching terminates. In contrast, if the application launching is terminated as a result of determination in operation 1040, the electronic device 201 may release the operation restriction on the operation-restricted processes and turn back to the original priority, then update the DB in operation 1045.

As set forth above, according to an embodiment, if the application launching time elapses, the electronic device 201 may turn the raised priority of the at least one process and at least one thread in the at least one process back to the original priority.

Figure 11:
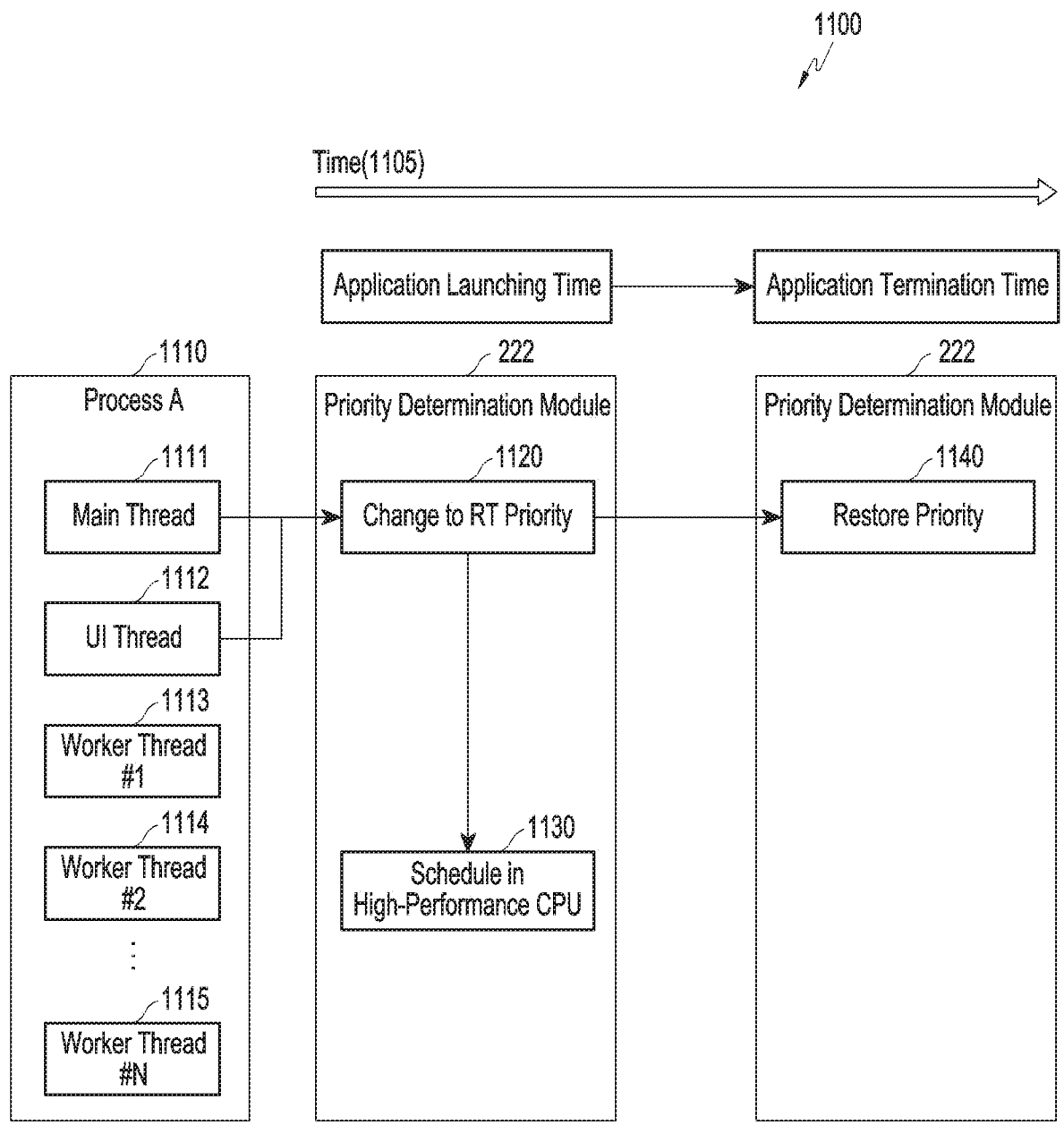
FIG. 11 is a view illustrating a launching target process control procedure based on priority according to an embodiment of the disclosure.

FIG. 11 is a view (1100) illustrating a launching target process control procedure based on priority according to an embodiment of the disclosure.

Referring to FIG. 11, it illustrates an example in which the application-associated launching target process (e.g., process A) 1110 includes a main thread 1111, a UI thread 1112, and a plurality of worker threads #1, #2, . . . , #N (1113, 1114, 1115). The main thread 1111 and UI thread 1112 of the launching target process (e.g., process A) 1110 need to first be executed without falling behind other process operations.

Thus, the priority determination module 222 may change (1120) the priority of the main thread 1111 and UI thread 1112 into the RT priority so as to assign a higher priority to the main thread 1111 and UI thread 1112 at the time of application launching along the time axis 1105. As such, by assigning the RT priority, longer CPU occupancy is possible, leading to quick processing. Further, the thread assigned the RT priority may be scheduled (1130) with a high-performance CPU for rapid processing.

Thereafter, at the time of termination of application, the priority determination module 222 may restore (1140) the changed priority. Here, the time of termination of the application may denote the time of completion of the application launching.

Although FIG. 11 illustrates an example of raising the priority for at least one thread in the launching target process, the priority for the process corresponding to detection of an event, e.g., binder call, may also be raised. For example, the priority determination module 222 may designate the process receiving a binder call from the launching target process as the high priority group while designating the process failing to receive a binder call as the low priority group. A normal priority may be assigned to newly generated processes and processes that do not belong to the priority DB.

Figure 12:
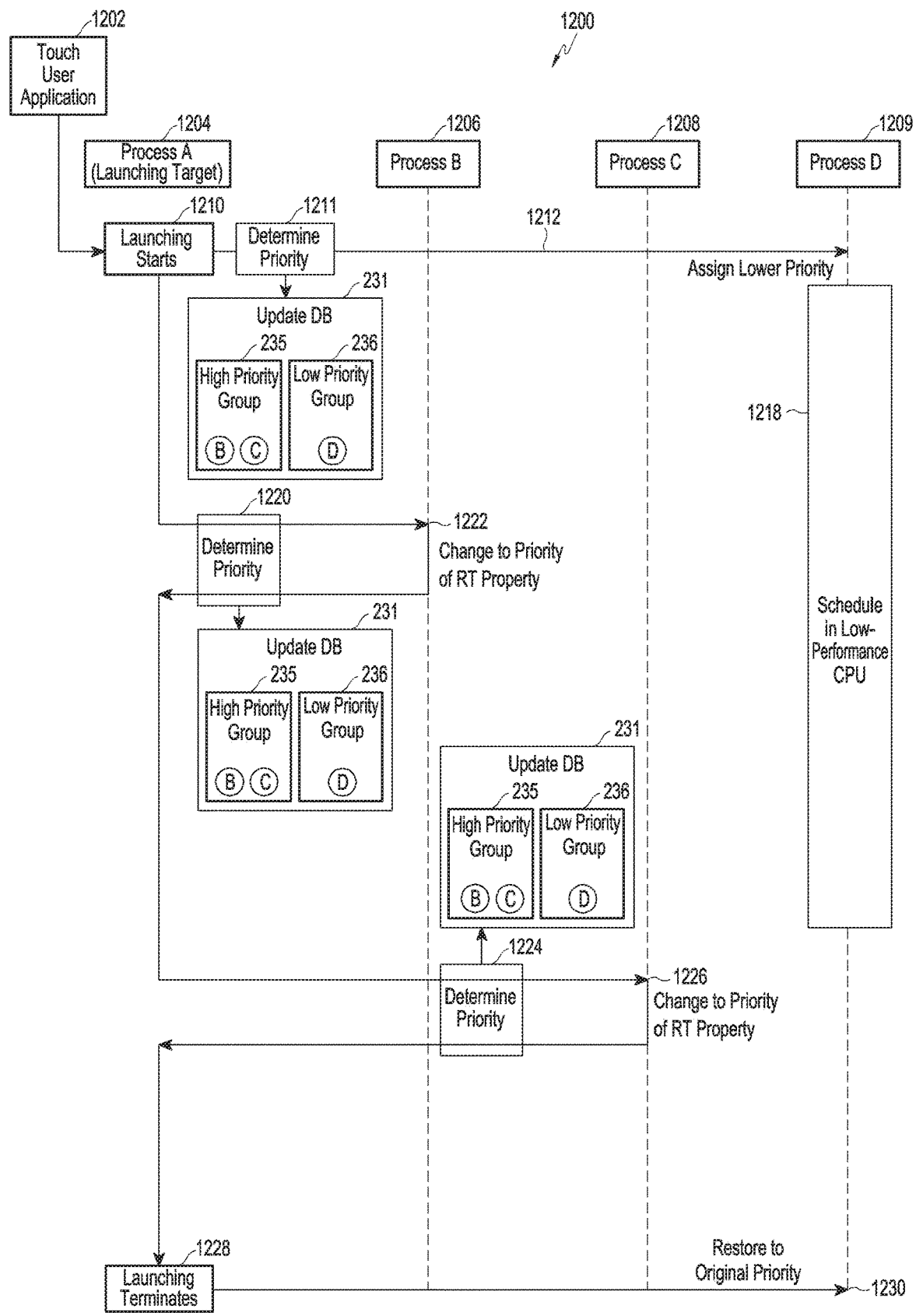
FIG. 12 is a view illustrating a process control procedure based on priority according to an embodiment of the disclosure.

FIG. 12 is a view (1200) illustrating a process control procedure based on priority according to an embodiment of the disclosure.

Referring to FIG. 12, if a user touch is input (1202) for running an application on the electronic device 201, application launching (1210) may commence. For example, if a plurality of processes associated with the application are processes A, B, C, and D, the application launching 1210 may be started by the user touch, and priority determination 1211 may be performed. If the launching target process is process A 1204, and process A 1204 is related to processes B and C 1206 and 1208, when the application launching 1210 begins, the priority determination module 222 may add processes B and C 1206 and 1208 to the high priority group 235 and process D 1209 to the low priority group 236, thereby updating (231) the DB. If there is an already built-up database including the high priority group 235 which includes processes B and C 1206 and 1208, and the low priority group 236 includes process D 1209, the priority determination module 222 may assign a lower priority to process D 1209 in operation 1212.

Thus, process D 1209 may be partially operation-restricted during the launching period due to its low priority and, even within the launching period, if some specific operation needs to be performed for binder communication with process A, it may be scheduled (1218) with a low-performance CPU. As such, since process D 1209 is not related to process A 1204, the priority of process D 1209 may be changed into a lower priority at the time of launching.

Thereafter, although process D 1209 needs to be operated during the launching period, it may be assigned a low-performance CPU and scheduled (1218) according to the lower priority. For example, examples of process D 1209 assigned a lower priority may include log daemon, garbage collection (GC), and Android BG and be restricted to operate on a low-performance CPU.

In contrast, during the period where priority determination is performed, e.g., a period of monitoring an event, e.g., binder call from process A 1204 to process B 1206 or from process A 1204 to process C 1208 as in operations 1220 and 1224, the priority for process B 1206 and process C 1208 may be changed into a higher priority, e.g., the RT priority as in operations 1222 and 1226. Thus, processes B and C 1206 and 1208 may be assigned a high-performance CPU and be thus quickly operated.

Thereafter, if the launching is terminated in operation 1228, the priority for processes B and C 1206 and 1208 and the priority for process D 1209 may be turned back to the original priorities in operation 1230. In this case, since the DB is updated whenever the priority changes, although the priorities are turned back to the original priorities, information about the change in priority for the application-associated process and at least one thread in the process may be cumulatively managed. As such, whenever the application runs, at least one process and at least one thread in the process may be classified into a high priority group and a low priority group, and the priority DB may be managed. Thus, rapid application launching based on adaptively changing priority may be ensured not only for applications that are frequently updated but also for other various kinds of applications.

For example, since binder communication from the main thread of process A 1204 of application to the Android system and another process is directly associated with the launching time, it may be assigned an RT priority to be first processed, thus shortening the launching time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C" and "at least one of A, B, or C" may include all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part" or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, there is provided a storage medium storing instructions, the instructions configured to, when executed by at least one process, enable the at least one processor to perform at least one operation, the at least one operation comprising identifying a plurality of processes associated with an application, identifying at least one process to be operation-restricted during at least partial time of a time of running the application among the plurality of processes, restricting an operation of the at least one identified process during the at least partial time of the time of running the application, and releasing the operation restriction on at least some of the at least one identified process in response to meeting a preset condition.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of the disclosure defined by the following claims.

What is claimed is:

1. An electronic device, comprising:
at least one processor; and
a memory storing instructions which, when executed by the at least one processor of the electronic device, cause the electronic device to:
in response to an input for executing an application, identify a plurality of processes to be restricted during at least a portion of a time of running the application based on dependencies between a the application and the plurality of processes,
restrict operation of the identified plurality of processes during the at least the portion of the time of running the application,
release the restriction on operation of a first process of the plurality of processes based on a detection of a first event, and
release the restriction on operation of the remaining processes of the plurality of processes, if the at least the portion of the time of running the application elapses.

2. The electronic device of claim 1, wherein the at least the portion of the time of running the application includes a launching time of the application.

3. The electronic device of claim 1, wherein the instructions further cause the electronic device to:
add the operation of the first process to an operation restriction group, and
in response to the detection of the first event, remove the first process from the operation restriction group, and
wherein the first process corresponds to the first event.

4. The electronic device of claim 3, wherein the operation restriction group is updated so that at least some processes included in the operation restriction group are varied whenever the application runs.

5. The electronic device of claim 1, wherein the instructions further cause the electronic device to:

determine a priority for at least one prioritized process except for the plurality of processes.

6. The electronic device of claim 5, wherein the instructions further cause the electronic device to:
increase a priority for at least one thread in the at least one prioritized process.

7. The electronic device of claim 6,
wherein the instructions further cause the electronic device to:
schedule the at least one thread to run in a first central processing unit (CPU) with a first operation speed, and
schedule another thread in the at least one prioritized process to run in a second CPU with a second operation speed, and
wherein the first operation speed is set to be higher than the second operation speed.

8. The electronic device of claim 6, wherein the instructions further cause the electronic device to:
when a launching time of the application elapses, change the priority for the at least one thread to an original priority.

9. The electronic device of claim 1, wherein the instructions further cause the electronic device to:
identify at least one background process that is not related to the application from among processes running in the background based on a dependency between the at least one background process and the plurality of processes, and
restrict an operation of the identified at least one background process during the at least the portion of the time of running the application.

10. The electronic device of claim 1, wherein the instructions further cause the electronic device to:
perform an operation of at least one third process except for the identified plurality of processes during the time of the running of the application, the at least one third process not being operation-restricted during the time of running the application.

11. A method for controlling execution of an application on an electronic device, the method comprising:
in response to an input for executing an application, identifying a plurality of processes to be restricted during at least a portion of a time of running the application based on dependencies between the application and the plurality of processes;
restricting operation of the identified plurality of processes during the at least the portion of the time of running the application;
releasing the restriction on operation of a first process of the plurality of processes based on a detection of a first event; and
releasing the restriction on operation of the remaining processes of the plurality of processes, if the at least the portion of the time of running the application elapses.

12. The method of claim 11,
wherein at least the portion of the time of running the application includes a launching time of the application.

13. The method of claim 11, further comprising:
adding the operation of the first process to an operation restriction group; and
in response to the detection of the first event, removing the first process from the operation restriction group, wherein the first process corresponds to the first event.

14. The method of claim 13, wherein the operation restriction group is updated so that at least some processes included in the operation restriction group are varied whenever the application runs.

15. The method of claim 11, further comprising assigning a higher priority to at least one prioritized process except for the plurality of processes and at least one thread in the at least one prioritized process.

16. The method of claim 15, further comprising:
scheduling the at least one thread to run in a first central processing unit (CPU) with a first operation speed; and
scheduling another thread in the at least one prioritized process to run in a second CPU with a second operation speed, and wherein the first operation speed is set to be higher than the second operation speed.

17. The method of claim 15, further comprising, when a launching time of the application elapses, changing the higher priority for the at least one prioritized process and the at least one thread to an original priority.

18. A non-transitory storage medium storing instructions, the instructions configured to, when executed by at least one processor of an electronic device, enable the electronic device to perform at least one operation, the at least one operation comprising:
in response to an input for executing an application, identifying a plurality of processes to be restricted during at least a portion of a time of running the application based on dependencies between the application and the plurality of processes,
restricting operation of the identified plurality of processes during the at least the portion of the time of running the application,
releasing the restriction on operation of a first process of the plurality of processes based on a detection of a first event, and
releasing the restriction on operation of the remaining processes of the plurality of processes, if the at least the portion of the time of running the application elapses.

* * * * *